(12) United States Patent
Chamberlain

(10) Patent No.: US 8,878,131 B2
(45) Date of Patent: Nov. 4, 2014

(54) PIN-COMPATIBLE INFRARED LIGHT DETECTOR HAVING IMPROVED THERMAL STABILITY

(75) Inventor: Timothy John Chamberlain, Edinburgh (GB)

(73) Assignee: Pyreos Ltd., Edinburgh (GB)

( * ) Notice: Subject to any disclaimer, the term of this patent is extended or adjusted under 35 U.S.C. 154(b) by 176 days.

(21) Appl. No.: 13/697,474

(22) PCT Filed: May 11, 2011

(86) PCT No.: PCT/EP2011/057611
§ 371 (c)(1),
(2), (4) Date: Jan. 29, 2013

(87) PCT Pub. No.: WO2011/141509
PCT Pub. Date: Nov. 17, 2011

(65) Prior Publication Data
US 2013/0126734 A1    May 23, 2013

(30) Foreign Application Priority Data

May 12, 2010   (DE) .......................... 10 2010 020 348

(51) Int. Cl.
*G01J 5/34*   (2006.01)

(52) U.S. Cl.
CPC ........................................ *G01J 5/34* (2013.01)
USPC .................................................... 250/338.2

(58) Field of Classification Search
CPC ........................................................ G01J 5/34
USPC ..................................................... 250/338.2
See application file for complete search history.

(56) References Cited

U.S. PATENT DOCUMENTS 4,468,658 A * 8/1984 Rossin .......................... 340/567

FOREIGN PATENT DOCUMENTS

| DE | 10221708 A1 | 12/2003 |
| DE | 69736470 T2 | 3/2007 |
| DE | 60126179 T2 | 5/2007 |
| EP | 0902536 A2 | 3/1999 |
| EP | 1156583 A2 | 11/2001 |
| JP | 2038933 A | 2/1990 |
| WO | 2008073402 A1 | 6/2008 |

* cited by examiner

*Primary Examiner* — Constantine Hannaher
*Assistant Examiner* — Hugh H Maupin
(74) *Attorney, Agent, or Firm* — Edell, Shapiro & Finnan, LLC

(57) ABSTRACT

An infrared light detector including at least one sensor chip that has a layer element that is produced from a pyroelectrically sensitive material and further has a base electrode and a head electrode, to which the layer element is connected for tapping electric signals generated in the layer element by irradiation of the at least one sensor chip with light. The detector further includes a transimpedance amplifier for amplifying the signals with an operational amplifier, which is asymmetrically operated by a supply voltage source having a positive supply voltage and to the inverting input of which the base electrode is connected. At the voltage supply source, a voltage divider connected to ground is provided with a partial node, to which a partial voltage that is smaller than the supply voltage is applied and which is electrically coupled to the non-inverting input and to the head electrode.

8 Claims, 1 Drawing Sheet

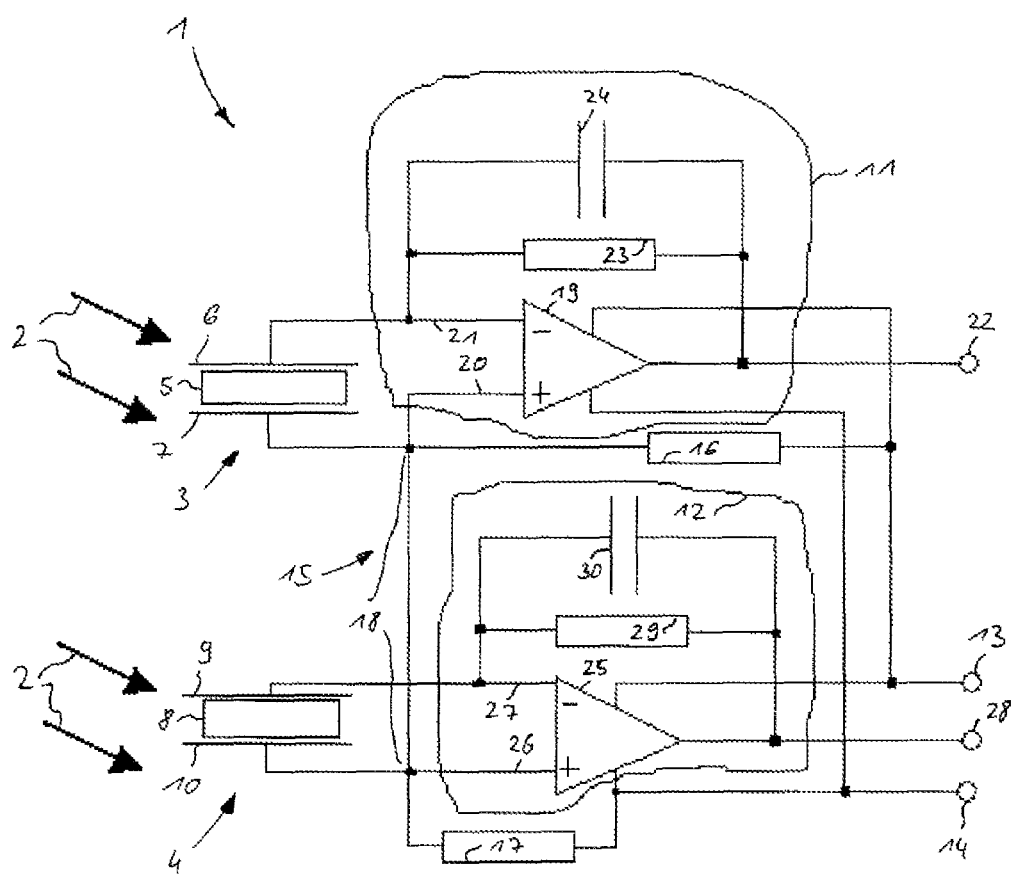

PIN-COMPATIBLE INFRARED LIGHT DETECTOR HAVING IMPROVED THERMAL STABILITY

The invention relates to a pin-compatible infrared light detector with improved thermal stability, and particularly to an infrared light detector having a signal amplifier which is pin-compatible.

By way of example, an infrared light detector for detecting thermal radiation has a thin film pyroelectric sensor chip with two electrode layers and a pyroelectric layer arranged between the electrode layers, said pyroelectric layer being made of a pyroelectrically sensitive material. This material is ferroelectric lead zirconate titanate (PZT). A signal amplifier circuit is included for the purpose of reading, amplifying, processing and/or relaying an electrical signal generated by the sensor chip as a result of thermal radiation. The electrical signal results from a charge transfer from the one electrode layer to the other electrode layer via the pyroelectric layer, such that a differential voltage and/or charge can be tapped at the electrode layers.

Pyroelectric infrared sensors are conventionally read by means of a "source follow" circuit, wherein the voltage which is induced between two electrodes is amplified by means of a high impedance resistor, for example of 10-100 giga-Ohm, and a junction-gate field effect transistor. The high impedance resistor in this circuit, combined with the relatively high capacities of the pyroelectric infrared sensors, leads to very large electrical time constants ($\tau_{el}=R*C_{pixel}$). Numerous gas detection devices which are based on a non-dispersive infrared absorption analyzer (NDIR) use pyroelectric infrared sensors for the purpose of measuring gas concentration. However, these gas detection devices have the disadvantage when in "source follow" mode that, when subjected to heating and/or vibration with a sharp time gradient—for example an undesired thermal shock and/or undesired shaking—they have a high electric time constant. This high electric time constant in "source follow" mode leads to a long "down time" of several seconds, during which time the gas measuring device is unable, in an undesired manner, to carry out measurements. Lack of sensitivity of gas detection devices to these undesired influences, for example due to undesired thermal shock and/or undesired shaking, is termed thermal stability.

The sensor chip has high capacitance due to its pyroelectric layer; the use of a transimpedance amplifier is known for the purpose of amplifying the charges present on the electrode layers. The transimpedance amplifier is conventionally constructed based on an operational amplifier. The operational amplifier has an inverting input and a non-inverting input, wherein the output of the operational amplifier is negative-feedback coupled via a resistor at the inverting input. The sensor chip is connected to the inverting input by means of one of its electrode layers, and is connected to ground via its other electrode layer. The non-inverting input is likewise grounded.

The output signal of the transimpedance amplifier is conventionally not generally compatible with a downstream readout device, the same being used in combination with a "source follow" circuit. The reason for this is that the transimpedance amplifier provides an electrical current as the output signal, while in contrast the "source follow" circuit provides an electric voltage as the output signal. As a result, infrared sensors which are based on a "source follow" readout device cannot be readily swapped for infrared sensors which are based on a transimpedance converter circuit. A swap of the infrared sensors would require a modification of the downstream readout device, which would involve a high-cost modification of the entire circuit board. An infrared light detector which is pin-compatible and based on a transimpedance amplifier would be desirable, wherein a modification of a readout device would not be required upon the use of an infrared sensor based on a "source follow" circuit.

The problem addressed by the invention is that of creating an infrared light detector having a transimpedance amplifier, the detector being pin compatible with an infrared sensor based on a "source follow" circuit, such that a modification of a readout device which is downstream of the infrared sensor based on the "source follow" circuit is not necessary, and the infrared sensor possesses high thermal stability.

The infrared light detector according to the invention has at least one sensor chip which has a layer element produced from a pyroelectrically sensitive material, as well as a base electrode and a head electrode, wherein the layer element is connected to the base electrode and head electrode for the purpose of tapping electrical signals generated in the layer element as a result of the electrodes receiving light radiation, and has a transimpedance amplifier for the purpose of amplifying the signals with an operational amplifier, the same operated asymmetrically with a supply voltage source with a positive supply voltage, wherein the base electrode is connected to the inverting input of the operational amplifier, wherein a voltage divider with a partial node, the former being grounded, is included on the supply voltage source, wherein a partial voltage which is lower than the supply voltage is present at the partial node, and the same is electrically coupled to both the non-inverting input and the head electrode. As a result of the configuration including the voltage divider, and the coupling of the partial node to the head electrode and the non-inverting input, the partial voltage is present at the head electrode and the non-inverting input. As a result, a reference voltage which is formed by the partial voltage is provided in the infrared light detector by the partial node, and is applied to an output signal of the transimpedance amplifier. It is thereby possible for the output signal of the transimpedance amplifier to be applied directly to a conventional circuit for the processing of the signal, said circuit being operated in voltage mode, without the need to adapt the circuit to the infrared light detector. As a result, the infrared light detector and additional conventional signal processing circuits which are connected to the infrared light detector work together in a pin-compatible manner. As a result, the infrared light detector, with its transimpedance amplifier and its pyroelectric sensor chip, can be operated together with conventional signal processing circuits in voltage mode. In addition, the infrared light detector according to the invention surprisingly has high thermal stability.

It is preferred that the voltage divider has a plurality of partial resistors which are connected in series and grounded. The voltage divider preferably has two of the partial resistors, wherein the partial node is situated between the two partial resistors. In this way, the value of the partial voltage is defined according to the supply voltage and according to the relationship of the resistance values of the partial resistors. Each of the partial resistors preferably has the same resistance value, so the value of the partial voltage is half as high as the value of the supply voltage.

In addition, it is preferred that the transimpedance amplifier has a negative feedback resistor which is configured between the inverting input and an output of the operational amplifier, wherein the negative feedback resistor has a value between 100 MΩ and 100 GΩ. An output signal of the transimpedance amplifier is present at the output of the operational amplifier, and is present at the inverting input as a signal which is amplified with respect to the partial nodes. As a result of the connection of the sensor chip and the non-inverting input to the partial node, the amplifying signal at the output of the operational amplifier is such that it is suitable for being processed further by conventional signal processing circuits.

In addition, it is preferred that the transimpedance amplifier has a negative feedback capacitor which is connected in parallel to the negative feedback resistor, between the inverting input and the output of the operational amplifier, wherein the negative feedback capacitor has a capacitance between 0.01 pF and 10 pF, and particularly preferably between 0.1 pF and 1 pF. The infrared light detector preferably comprises at least two of the sensor chips, wherein one of the transimpedance amplifiers is connected to each of the same, wherein the transimpedance amplifiers are connected to the supply voltage source and to the partial node in parallel.

A preferred embodiment of an infrared light detector is explained below with reference to the attached schematic drawing. The FIGURE shows a schematic circuit diagram of the infrared light detector.

As can be seen in the FIGURE, an infrared light detector 1 has a first sensor chip 3 and a second sensor chip 4, wherein the sensor chips 3, 4 each have a pyroelectric layer element 5, 8. Light 2 which arrives at the infrared light detector 1 hits the sensor chips 3, 4, and charges are then transferred to the pyroelectric layer elements 5, 8.

The sensor chips 3, 4 each have a base electrode 6, 9 and a head electrode 7, 10, wherein the pyroelectric layer element 5, 8 in each case is arranged and is tapped between the base electrode 6, 9 and the head electrode 7, 10. The charges transferred to the sensor chips 3, 4 as a result of the arriving light 2 produce a signal which must be amplified. The amplification of the signal is realized in the first sensor chip 3 by means of a first transimpedance amplifier 11, and in the second sensor chip 4 by means of a second transimpedance amplifier 12.

A supply voltage source 13 is included for the purpose of supplying the infrared light detector 1, and provides a positive supply voltage relative to a ground 14. A voltage divider 15 which is formed by a first partial resistor 16 and a second partial resistor 17 is connected to the supply source 13, wherein the partial resistors 16, 17 are connected in series and grounded to the ground 14. A partial node 18 results from this configuration, between the first partial resistor 16 and the second partial resistor 17, with a partial voltage relative to the ground 14. The first partial resistor 16 and the second partial resistor 17 each have the same resistance value, such that the partial voltage is half as high as the supply voltage.

The transimpedance amplifiers 11, 12 each have an operational amplifier 19, 25 having a non-inverting input 20, 26 and an inverting input 21, 27, as well as an output 22, 28. A negative feedback resistor 23, 29 and a negative feedback capacitor 24, 30 are included in parallel between the inverting input 21, 27 and the output 22, 28, wherein the transimpedance amplifier 11, 12 is formed by the negative feedback resistor 23, 29, the negative feedback capacitor 24, 30, and the operational amplifier 19, 24.

The base electrode 6, 9 of each sensor chip 3, 4 is connected to the respective inverting input 21, 27, while the head electrodes 7, 10 are connected to the partial nodes 18 together with the non-inverting input 20, 26. The operational amplifiers 19, 25 are operated asymmetrically by the supply voltage source 13, wherein one of the supply connections of the operational amplifier 19, 25 is connected to the supply voltage source 13, and the other of the supply connections of the operational amplifier 19, 25 is connected to ground 14.

The negative feedback capacitors 24, 30 preferably have a capacitance between 0.01 pF and 10 pF, particularly preferably between 0.1 pF and 1 pF. The electrical time constant is defined as $\tau_{el} = R_{negativefeedbackresistor} * C_{negativefeedbackcapacitor}$. Compared to a conventional "source follow" circuit, the time constant is reduced, with the same resistance values with the ratio $C_{pixel}$ to $C_{negativefeedbackcapacitor}$.

According to the invention, the sensor chips 2, 4 are connected to the transimpedance amplifiers 11, 12, such that pin-compatibility is offered with a readout circuit in the conventional "source follow" mode. In addition, the infrared light detector 1 possesses high thermal stability due to its design according to the invention.

LIST OF REFERENCE NUMBERS 1 infrared light detector
2 arriving light
3 first sensor chip
4 second sensor chip
5, 8 pyroelectric layer element
6, 9 base electrode
7, 10 head electrode
11 first transimpedance amplifier
12 second transimpedance amplifier
13 supply voltage source
14 ground
15 voltage divider
16 first partial resistor
17 second partial resistor
18 partial node
19, 25 operational amplifier
20, 26 non-inverting input
21, 27 inverting input
22, 28 output
23, 29 negative feedback resistor
24, 30 negative feedback capacitor

The invention claimed is:

1. An infrared light detector comprising:
at least one sensor chip (3, 4) that includes a layer element (5, 8) made of a pyroelectrically sensitive material, a base electrode (6, 9) and a head electrode (7, 10),
wherein the layer element (5, 8) is connected to the base electrode (6, 9) and the head electrode (7, 10) to tap an electrical signal generated in the layer element (5, 8) as a result of light (2) radiation applied to the base electrode (6, 9) and the head electrode (7, 10), and
a transimpedance amplifier (11, 12) for amplifying the signal, with an operational amplifier (19, 25) which is operated asymmetrically by a supply voltage source (13) having a positive supply voltage,
wherein the base electrode (6, 9) is connected to the inverting input (21, 27) of the operational amplifier (19, 25), and a voltage divider (15) connected to ground (14) at the supply voltage source (13) includes a partial node (18) where a partial voltage that is lower than the supply voltage is present, wherein the partial node (18) is electrically coupled to the non-inverting input (20, 26) as well as to the head electrode (7, 10).

2. An infrared light detector according to claim 1, wherein the voltage divider has a plurality of partial resistors (16, 17) which are connected in series and connected to ground (14).

3. An infrared light detector according to claim 2, wherein the voltage divider (15) has two of the partial resistors (16, 17) between which the partial node (18) is situated.

4. An infrared light detector according to claim 3, wherein each of the partial resistors (16, 17) has the same resistance value.

5. An infrared light detector according to claim 1, wherein the transimpedance amplifier (11, 12) has a negative feedback resistor (23, 29) which is connected between the inverting input (21, 27) and an output (22, 28) of the operational amplifier (19, 25), wherein the negative feedback resistor (23, 29) has a value between 100 MΩ and 100 GΩ.

6. An infrared light detector according to claim 5, wherein the transimpedance amplifier (11, 12) has a negative feedback capacitor (24, 30) which is connected in parallel to the negative feedback resistor (23, 29) between the inverting input (21, 27) and the output (22, 28) of the operational amplifier (19, 25), wherein the negative feedback capacitor (24, 30) has a capacitance between 0.01 pF and 10 pF.

7. An infrared light detector according to claim 6, wherein the capacitance is between 0.1 pF and 1 pF.

8. An infrared light detector according to claim 1, wherein the infrared light detector (1) has at least two of the sensor chips (3, 4), wherein one of the transimpedance amplifiers (11, 12) is connected to each of the said sensor chips (3, 4), and wherein the transimpedance amplifiers (11, 12) are connected in parallel to the supply voltage source (13) and to the partial node (18).

* * * * *